(12) United States Patent
Ludwig et al.

(10) Patent No.: US 10,705,511 B2
(45) Date of Patent: Jul. 7, 2020

(54) ABSTRACTION LAYERS FOR AUTOMATION APPLICATIONS

(71) Applicant: Siemens Aktiengesellschaft, Munich (DE)

(72) Inventors: Hartmut Ludwig, West Windsor, NJ (US); Kurt Dirk Bettenhausen, West Windsor, NJ (US); Hermann Friedrich, Zorneding (DE); Lingyun Wang, Princeton, NJ (US)

(73) Assignee: Siemens Aktiengesellschaft, Munich (DE)

( * ) Notice: Subject to any disclaimer, the term of this patent is extended or adjusted under 35 U.S.C. 154(b) by 25 days.

(21) Appl. No.: 16/119,006

(22) Filed: Aug. 31, 2018

(65) Prior Publication Data

US 2020/0019147 A1 Jan. 16, 2020

Related U.S. Application Data

(60) Provisional application No. 62/696,470, filed on Jul. 11, 2018.

(51) Int. Cl.
*G05B 19/418* (2006.01)

(52) U.S. Cl.
CPC ........... *G05B 19/4186* (2013.01); *G05B 2219/31082* (2013.01); *G05B 2219/31368* (2013.01); *G05B 2219/34263* (2013.01)

(58) Field of Classification Search
None
See application file for complete search history.

(56) References Cited

U.S. PATENT DOCUMENTS 5,862,391 A * 1/1999 Salas ............... G01D 4/002
713/300
9,946,244 B2 * 4/2018 Lo ................ G05B 19/056
(Continued)

FOREIGN PATENT DOCUMENTS

RU 2509332 C1 3/2014
WO 2016111694 A1 7/2016
(Continued)

OTHER PUBLICATIONS

EP Search Report dated Dec. 6, 2019; European patent application No. 19 185 666.5; 14 pages.
(Continued)

*Primary Examiner* — Ramesh B Patel

(57) ABSTRACT

A system for implementing automation functions through abstraction layers includes a control application and an automation equipment abstraction framework executable in a runtime environment. The control application is designed to communicate with automation equipment using one or more automation functions. Each automation function comprises one or more equipment-agnostic instructions. During execution of the control application, the automation equipment abstraction framework receives an equipment-agnostic instructions and an indication of a particular unit of automation equipment. The automation equipment abstraction framework translates the equipment-agnostic instructions into equipment-specific automation instructions executable on the particular unit of automation equipment. These equipment-specific automation instructions may then be sent to the particular unit of automation equipment.

20 Claims, 2 Drawing Sheets

(56) References Cited

U.S. PATENT DOCUMENTS

| | | | |
|---|---|---|---|
| 10,365,626 B2* | 7/2019 | Lo | G05B 19/05 |
| 2003/0235211 A1 | 12/2003 | Thiru et al. | |
| 2006/0271255 A1* | 11/2006 | Stott | G05B 23/0232 |
| | | | 701/31.4 |
| 2011/0022198 A1 | 1/2011 | Plache et al. | |
| 2013/0201316 A1* | 8/2013 | Binder | H04L 67/12 |
| | | | 348/77 |
| 2016/0054720 A1* | 2/2016 | Lo | G05B 19/056 |
| | | | 700/87 |
| 2016/0067864 A1 | 3/2016 | Mullan et al. | |
| 2016/0239011 A1* | 8/2016 | Lo | G05B 19/05 |
| 2017/0017221 A1* | 1/2017 | Lamparter | G05B 19/056 |
| 2017/0315531 A1* | 11/2017 | Aparicio Ojea | G05B 19/4183 |
| 2017/0371311 A1* | 12/2017 | Aparicio Ojea | G05B 19/0423 |
| 2018/0011465 A1* | 1/2018 | Lo | G05B 19/042 |
| 2018/0046522 A1* | 2/2018 | Adamson | G06F 9/54 |
| 2018/0224821 A1* | 8/2018 | Lamparter | G05B 19/05 |
| 2018/0292797 A1* | 10/2018 | Lamparter | G05B 19/05 |
| 2018/0300124 A1* | 10/2018 | Malladi | H04L 29/08 |
| 2018/0314225 A1* | 11/2018 | Bisse | G05B 19/05 |
| 2019/0220271 A1* | 7/2019 | Olderdissen | G06F 8/656 |

FOREIGN PATENT DOCUMENTS

| | | |
|---|---|---|
| WO | 20160209483 A1 | 12/2016 |
| WO | 2017220279 A1 | 12/2017 |

OTHER PUBLICATIONS

Timo Lehto et al.: "Open interfaces in terminal automation platform"; Sep. 1, 2017 (Sep. 1, 2017), pp. 1-16; XP055646898; Retrieved from the Internet: URL:https://www.kalmarglobal.com/4a62db/globalassets/automation/kalmar-key/whitepape.

RU Examination Report dated Apr. 17, 2020; Russian patent application No. 2019121554; 26 pages.

* cited by examiner

ABSTRACTION LAYERS FOR AUTOMATION APPLICATIONS

CROSS-REFERENCE TO RELATED APPLICATIONS

This application claims the benefit of U.S. Provisional Application Ser. No. 62/696,470, filed Jul. 11, 2018, which is incorporated herein by reference in its entirety.

TECHNICAL FIELD

The present invention relates generally to systems, methods, and apparatuses that utilize abstraction layers to allow the execution of automation functions in a platform agnostic manner. The disclosed technology may be applied, for example, to enhance the flexibility of the controller to different automation scenarios.

BACKGROUND

Automation systems are used to control the operation of machines and other components in a systematic manner. Typical automation systems usually include equipment from multiple vendors. Each piece of equipment may use vendor-specific programming languages, runtime environments, and protocols. This makes the task of integrating equipment challenging. For example, an automation function designed to execute on equipment from a particular vendor may not be executable on equipment from other vendors. To further complicate system design and integration, there are a number of protocols that the equipment may use for communications or other activities for interfacing with other components of the automation system. With conventional systems, support for these protocols must be "hardcoded" within the automation functions themselves; thus, making the automation functions even more dependent on a particular system implementation.

To reduce the time required to develop and deploy automation functions, it is desired to provide a framework that abstracts the implementation details of the underlying automation system and equipment.

SUMMARY

Embodiments of the present invention address and overcome one or more of the above shortcomings and drawbacks, by providing methods, systems, and apparatuses related to a framework that abstracts automation equipment and production level details, across domains, with soft-wired automation functions.

According to some embodiments, a system for implementing automation functions through abstraction layers includes a control application and an automation equipment abstraction framework executable in a runtime environment. The control application is designed to communicate with automation equipment using one or more automation functions. Each automation function comprises one or more equipment-agnostic instructions. During execution of the control application, the automation equipment abstraction framework receives equipment-agnostic instructions and an indication of a particular unit of automation equipment. The automation equipment abstraction framework translates the equipment-agnostic instructions into equipment-specific automation instructions executable on the particular unit of automation equipment. These equipment-specific automation instructions may then be sent to the particular unit of automation equipment.

According to other embodiments, a system for implementing automation functions through abstraction layers includes a control application and a production abstraction framework executable in a runtime environment. The control application is designed to communicate with automation equipment using one or more automation functions. Each automation function comprises one or more production environment-agnostic instructions. During execution of the control application, the production abstraction framework receives production environment-agnostic instructions and an indication of a target production environment. The production abstraction framework translates the production environment-agnostic instructions into production environment-specific automation instructions executable on a particular unit of automation equipment in the target production environment. The production environment-specific automation instructions may then be sent to the particular unit of automation equipment.

According to other embodiments, a system for implementing automation functions through abstraction layers comprises a control application and a runtime environment. The control application is designed to communicate with automation equipment using one or more automation functions. Each automation function comprises instructions that are agnostic with respect to automation equipment and production environment. The runtime environment includes an automation equipment abstraction layer that translates at least a portion of the instructions into equipment-specific automation instructions executable on a particular unit of automation equipment. The runtime environment further includes a production abstraction layer that translates at least a portion of instructions into production environment-specific automation instructions executable by the particular unit of automation equipment in a target production environment.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION

The following disclosure describes the present invention according to several embodiments directed at methods, systems, and apparatuses related to a framework for abstracting automation equipment. As described in further detail below, the aforementioned framework allows the development of "automation functions." Each automation function comprises a set of instructions for performing an automation task in a generic (i.e., not equipment-specific) manner. One of the objectives of the framework described herein is to abstract, not replace, the requirements of different computing systems. For example, automation equipment may implement industrial standard protocols such as DDS, OPC UA or MTConnect. The framework described herein abstracts the details of these protocols into an interface that a developer can use to develop an automation function that is agnostic to the protocol used by the underlying hardware on which the code executes.

Figure 1:
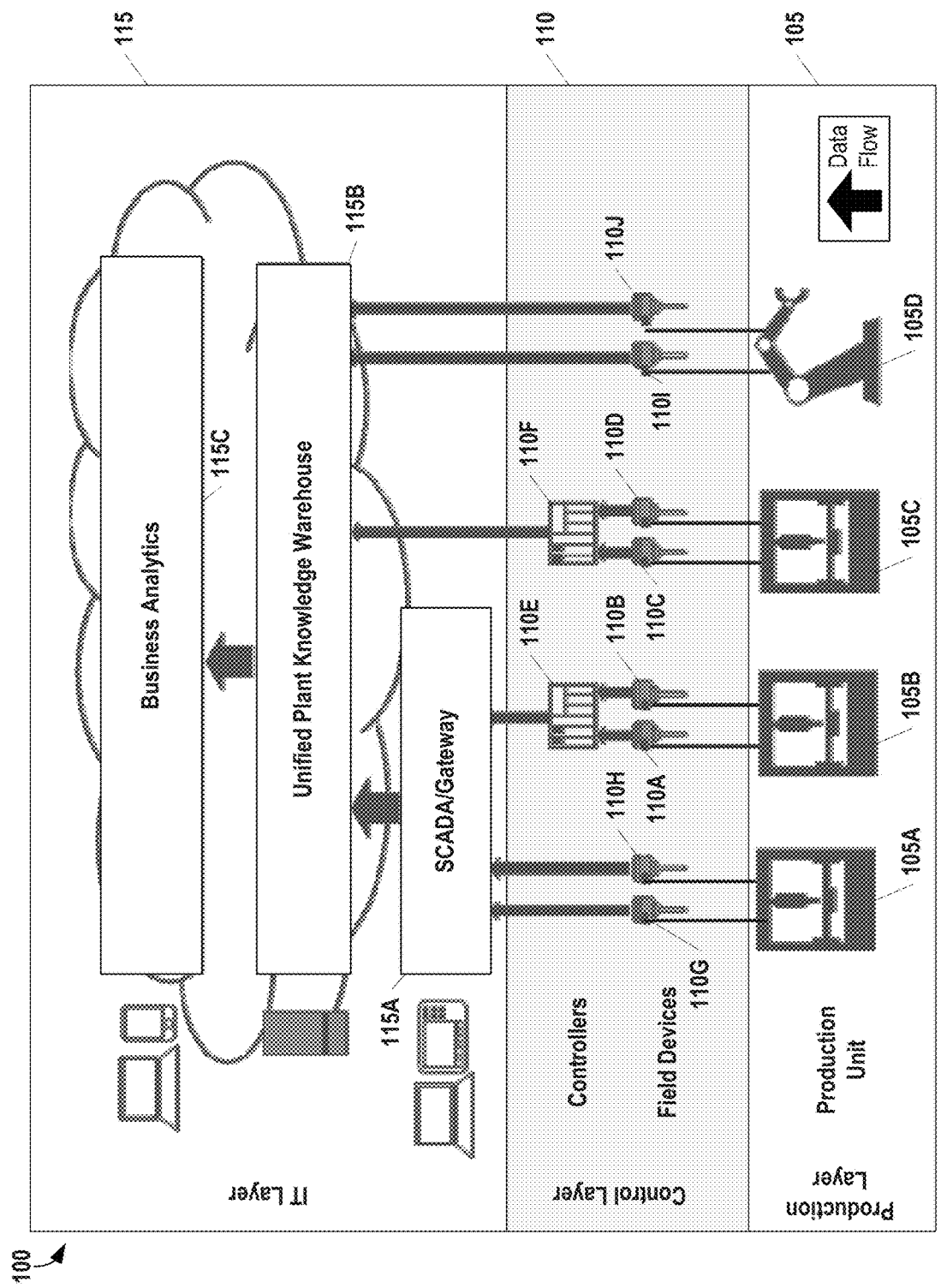
FIG. 1 provides an illustration of an automation system, wherein some embodiments of the present invention may be implemented.

FIG. 1 provides an illustration of an automation system 100, wherein some embodiments of the present invention may be implemented. This example conceptually partitions an industrial environment into a Production Layer 105, a Control Layer 110, and an IT Layer 115. Briefly, data received from the Production Units (e.g., Units 105A, 105B, 105C, and 105D) is transferred by the Control Layer Devices to the IT Layer 115. The IT Layer 115 includes systems which perform various post-processing and storage tasks. The example of FIG. 1 includes a Supervisory Control and Data Acquisition (SCADA) Server (or Gateway) Component 115A. This Component 115A allows an operator to remotely monitor and control the devices at the Control Layer 110 and Production Layer 105. Additionally, the SCADA Server Component 115A collects data from the lower layers 105, 110 and processes the information to make it available to the Unified Plant Knowledge Warehouse 115B. The Unified Plant Knowledge Warehouse 115B provides further processing and storage of the data received from the lower layers 105, 110. The Unified Plant Knowledge Warehouse 115B may perform various functions in different embodiments of the present invention. For example, in some embodiments, the Unified Plant Knowledge Warehouse 115B includes functionality for supporting Business Analytics 115C based on the data generated by the lower layers 105, 110.

In conventional systems, the automation equipment at each layer is highly customized based on particular computing architecture. For example, in FIG. 1, the automation equipment at the Controller Layer 110 includes two Controllers 110E, 110F and eight Field Devices 110A, 110B, 110C, 110D, 110G, 110H, 110I, and 110J. Each unit of automation equipment potentially has a different computing architecture (e.g., operating system, use and support of networking protocols, information model, etc.). Software executable on each unit must be developed in a manner that specifically takes into account the requirements of the computing architecture. As an example, if Controller 110E executes a particular operating system and set of networking protocols, the developer must customize the software to use each of these items. Because software is customized for Controller 110E, it cannot be readily reused on Controller 110F unless both controllers have the same computing architecture.

With the techniques described herein, a pre-integration plug-in may be installed at each unit of automation equipment at the Control Layer 110 to allow the abstract for the computing architecture of the underlying automation equipment. Each plug-in implements an automation system abstraction framework (described in more detail below). Briefly, the framework allows developers to create automation programs by connecting a plurality of automation functions. The framework decouples these automation functions from the automation equipment on which they execute or with which we interact. Each automation function is agnostic to, for example, the actual automation equipment hardware (e.g., a PLC or an IPC); the underlying communication protocols (e.g., DDS or OPC UA); and the Fieldbus protocol (e.g., Profinet or Ethernet). Each automation function is also agnostic to the industrial execution environment (e.g., IEC 61131 or IEC 61499). Abstraction layers are built at each layer of the framework to facilitate the decoupling of automation functions and automation equipment.

Figure 2:
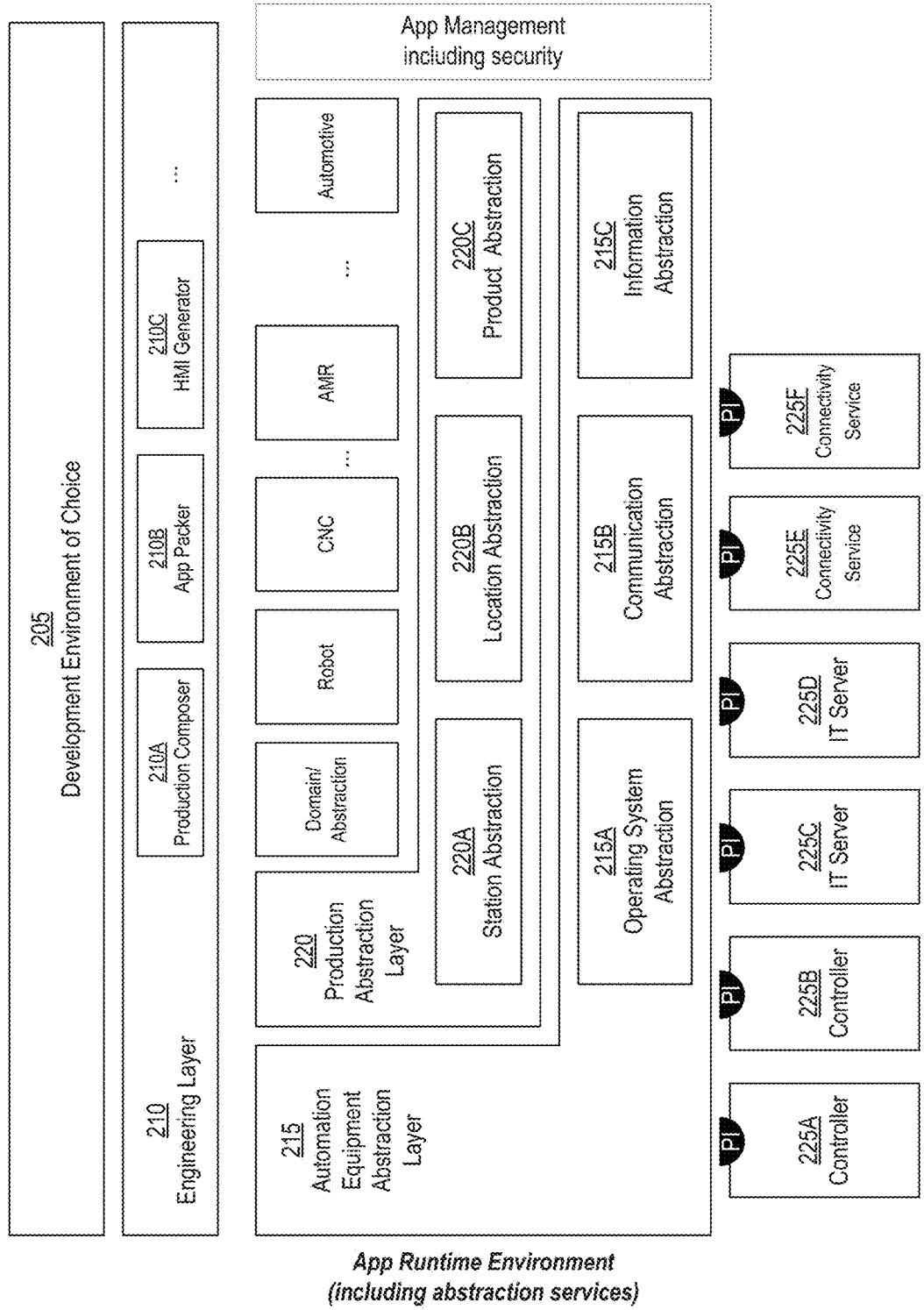
FIG. 2 illustrates a framework for automation system abstraction, as it may be implemented in some embodiments.

FIG. 2 illustrates a Framework 200 for automation system abstraction, as it may be implemented in some embodiments. The core of the Framework 200 is two abstraction layers 215, 220 that execute in a runtime environment. Once the abstraction layers 215, 220 are built, the control application code written for automation functions can run anywhere, everywhere. The abstraction layers 215, 220 can be deployed, for example, on a PC, in a cloud-based computing environment, or on any vendor specific runtime platform environment. Because the abstraction layers 215, 220 provide the common interfaces to the automation function(s), the same control code can run on any unit of automation equipment.

An Automation Equipment Abstraction Layer 215 includes components 215A, 215B, 215C that abstract different functional characteristics of the automation equipment 225A, 225B, 225C, 225D, 225E, 225F. Briefly, the Operating System Abstraction Component 215A abstracts operating system-dependent functionality. As a simple example, assume that Controller 225A uses a Windows-based operating system, while Controller 225B uses a UNIX based operating system. Basic operations and system primitives differ between these two operating systems. The Operating System Abstraction Component 215A receives a generic functional call from an automation function and translates that function call to an operating system-specific function call suitable for the target automation equipment. The Communication Abstraction Component 215B operates in a similar manner, but with respect to communication protocols such as DDS, OPC, TCP, MQTT, etc., while the Information Abstraction Component 215C translates information between different information models that may be used.

It should be noted that, in each case, the abstraction component 215A, 215B, 215C does not implement the functionality of the operating system, communication protocol, etc.; rather the abstraction component 215A, 215B, 215C hides the specifics of already existing once. Thus, the Automation Equipment Abstraction Layer 215 does not implement the real functionality required by automation functions; rather the Automation Equipment Abstraction Layer 215 pre-integrates existing solutions and standards. By abstraction, the communality is modelled, which makes the underlying solutions/standards exchangeable. Because each of these communication protocols is pre-integrated, the developer can use a mix of all, or some, at the same time, without any programming effort and little or no configuration effort.

The Automation Equipment Abstraction Layer 215 is different from a platform. A platform builds from ground up and is based on standards or proprietary technology; it can grow only up. Conversely, the Automation Equipment Abstraction Layer 215 sits between automation functions and the automation equipment that is used by those functions. The Automation Equipment Abstraction Layer 215 allows things to be exchangeable between the automation functions and the equipment Like a platform, the Automation Equipment Abstraction Layer 215 can grow up and down, but unlike a platform, the Automation Equipment Abstraction Layer 215 can also grow left and right to support new automation functions and/or automation equipment.

The Production Abstraction Layer 220 operates in a manner similar to the Automation Equipment Abstraction Layer 215, but in the context of the details of the production environment. The Station Abstraction Component 220A is similar to the Operating System Abstraction Component 215A in that it abstracts the details of the station's assembly process and other activities. The Location Abstraction Component 220B abstracts any location-specific details about the production environment, and the Product Abstraction Component 220C abstracts details about the product being produced.

Developers operate at the Engineering Layer 210 through a Development Environment of Choice 205. In general, the Development Environment of Choice 205 can be any development environment known in the art (e.g., supporting C, Java, Matlab, Python, etc.). For example, in one embodiment, the Development Environment of Choice 205 is the Siemens Totally Integrated Automation (TIA) Portal. The Engineering Layer 210 includes components 210A, 210B, 210C that facilitate the generation of programs that utilize the capabilities of the Automation Equipment Abstraction Layer 215 and the Production Abstraction Layer 220.

The Production Composer Component 210A allows the creation of programs using one or more automation functions. A control application or other automation program can be implemented by connecting multiple automation functions. The automation functions are "soft-wired" together. That is, rather than directly linking automation functions together through functional calls, the use of the Automation Equipment Abstraction Layer 215 and the Production Abstraction Layer 220 as intermediaries allows more flexibility as the overall software architecture evolves over time. Moreover, because automation functions are platform-agnostic and can run on any equipment that supports the abstraction layers 215, 220 of reusable automation functions and can be created and stored, for example, in an online marketplace. In some embodiments, the Production Composer Component 210A may include a GUI with "drag and drop" or similar functionality that allows automation functions to be soft-wired, thus facilitating rapid development of automation applications.

Once an automation program has been developed through the Production Composer Component 210A, an App Packer Component 210B deploys the program on one or more units of automation equipment. This combines the automation functions into one or more files that are executable on a target unit of automation equipment. In some embodiments, the user may directly provide the target unit to the App Packer Component 210B so that it can identify the appropriate compiler, etc. In other embodiments, the App Packer Component 210B may automatically detect the target computer based on a configuration file that describes the system in which the automation equipment operates.

A Human Machine Interface (HMI) Generator Component 210C may be used to generate GUIs and other HMIs that can be displayed on automation equipment in the production environment. The HMI Generator Component 210C analyzes automation functions to determine what information should be displayed to users via the HMI. In some embodiments, the developer can add specific code in the automation function to indicate a value that should be output. For example, in one embodiment, there are type definitions that allow developers that should be output via the HMI (e.g., "hmi_integer" to declare integers). In other embodiments, a function call may be used that functions in a manner similar to a print statement. The HMI Generator Component 210C parses the code to detect these items and generates the HMI accordingly. In some embodiments, the HMI Generator Component 210C uses a plurality of pre-generated templates in generating the HMIs. A template may be selected by the HMI Generator Component 210C, for example, based on the types of values that need to be displayed. For example, a template may be pre-generated for 3 integer values; when the HMI generator component 210C finds that an automation function requires the display of 3 integer values, this template may be utilized. Once an HMI is generated, it can be deployed, for example, via a connection between the HMI Generator Component 210C and the display device (not shown in FIG. 2). Alternatively, the App Packer Component 210B may be used to include the HMI in a package that can be deployed to the display units in the production environment.

Each unit of automation equipment 225A, 225B, 225C, 225D, 225E, 225F includes a plug-in component (labeled "PI" in FIG. 2). Each plug-in component installed at a particular unit of automation equipment that facilitates communications between the particular unit of automation equipment and a runtime environment that executes the automation equipment abstraction layer 215 and the production abstraction layer 220. In some embodiments, the runtime environment is executed on the particular unit of automation equipment itself. For example, Controller 225A may execute an application that provides the runtime environment. In other embodiments, the runtime environment may be executed on a computing system connected to the particular unit of automation equipment via one or more networks.

Various techniques may be used for implementing the runtime environment. For example, in some embodiments, the runtime environment comprises a virtual machine customized for the particular unit of automation equipment and the production environment. The automation functions may be compiled into an application executable in the virtual machine. The virtual machine can then interpret each instruction of that application and make translations, as necessary, using the functionality of the automation equipment abstraction layer 215 and the production abstraction layer 220. Alternatively, the virtual machine may use a just-in-time (JIT) compiler that compiles the code of the application into native machine code executable on the automation equipment that executes the runtime environment. As the JIT compiler performs the compilation process, it uses the functionality of the automation equipment abstraction layer 215 and the production abstraction layer 220 as necessary to insert any equipment-specific automation instructions or production environment-specific instructions.

In some embodiments, Automation Functions (AFs) are downloaded incrementally and independently on demand. The application can thus be understood to be an aggregation of all deployed AFs at a given point of time. That is, as the programmer wishes to use an AF, the programmer may type a description (e.g., name, signature, etc.), and then the corresponding AF can be retrieved from a remote source. In some embodiments, the concept of on-demand deployment can be applied at runtime. For example, the code deployed to automation equipment may not include the object code for the AFs themselves; rather the code may include references to AFs that can be parsed during runtime and used to retrieve the AFs from a remote source. In some embodiments, the references to the AF can be explicit (e.g., a network address). In other embodiments, the references only include the name of the AF or other identifying information. Then, a component of the runtime environment (e.g., the aforementioned virtual machine) may include functionality that enables the component to retrieve the identified AF from the remote resource. For example, the virtual machine discussed above may be configured with a list of servers that include AFs. Upon detecting an AF, the servers are contacted to retrieve the AF. Once retrieved, the runtime environment can execute the AF as specified.

The processors described herein as used by programmable logic controllers may include one or more central processing units (CPUs), graphical processing units (GPUs), or any other processor known in the art. More generally, a processor as used herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a computer, controller or microprocessor, for example, and be conditioned using executable instructions to perform special purpose functions not performed by a general purpose computer. A processor may be coupled (electrically and/or as comprising executable components) with any other processor enabling interaction and/or communication there-between. A user interface processor or generator is a known element comprising electronic circuitry or software or a combination of both for generating display images or portions thereof. A user interface comprises one or more display images enabling user interaction with a processor or other device.

Various devices described herein including, without limitation, the programmable logic controllers and related computing infrastructure may comprise at least one computer readable medium or memory for holding instructions programmed according to embodiments of the invention and for containing data structures, tables, records, or other data described herein. The term "computer readable medium" as used herein refers to any medium that participates in providing instructions to one or more processors for execution. A computer readable medium may take many forms including, but not limited to, non-transitory, non-volatile media, volatile media, and transmission media. Non-limiting examples of non-volatile media include optical disks, solid state drives, magnetic disks, and magneto-optical disks. Non-limiting examples of volatile media include dynamic memory. Non-limiting examples of transmission media include coaxial cables, copper wire, and fiber optics, including the wires that make up a system bus. Transmission media may also take the form of acoustic or light waves, such as those generated during radio wave and infrared data communications.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

The functions and process steps herein may be performed automatically, wholly or partially in response to user command. An activity (including a step) performed automatically is performed in response to one or more executable instructions or device operation without user direct initiation of the activity.

In the present application, the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112(f), unless the element is expressly recited using the phrase "means for."

We claim:

1. A system for implementing automation functions through abstraction layers, the system comprising:
   a control application designed to communicate with automation equipment using one or more automation functions, wherein each automation function comprises one or more equipment-agnostic instructions;
   an automation equipment abstraction framework executable in a runtime environment, wherein the automation equipment abstraction framework is configured to:
      during execution of the control application, receiving equipment-agnostic instructions and an indication of a particular unit of automation equipment;
      translate the equipment-agnostic instructions into equipment-specific automation instructions executable on the particular unit of automation equipment,
      send the equipment-specific automation instructions to the particular unit of automation equipment; and a production abstraction layer executable in the runtime environment, wherein the production abstraction layer is configured to:
   abstract details of a unit of automation equipment's assembly process;
   abstract location specific details regarding a production environment; and
   abstract details about a product being produced.

2. The system of claim 1, further comprising:
a plug-in component installed at the particular unit of automation equipment that facilitates communications between the particular unit of automation equipment and the automation equipment abstraction framework.

3. The system of claim 2, wherein the runtime environment is executed on the particular unit of automation equipment.

4. The system of claim 2, wherein the runtime environment is executed on a computing system connected to the particular unit of automation equipment via one or more networks.

5. The system of claim 1, wherein (a) the particular unit of automation equipment is controlled by a controller executing an operating system; and (b) the automation equipment abstraction framework comprises a operation system abstraction component for translating the equipment-agnostic instructions into equipment-specific instructions executable by the operating system.

6. The system of claim 1, wherein (a) the particular unit of automation equipment is accessible via a network using a communication protocol; and (b) the automation equipment abstraction framework comprises a communication abstraction component for sending the equipment-agnostic instructions over the network using the communication protocol.

7. The system of claim 6, wherein the communication protocol is a Fieldbus protocol.

8. The system of claim 1, wherein the automation equipment abstraction framework comprises a product composer component configured to automatically create the automation functions based on functionality requested by a user via a graphical user interface (GUI).

9. A system for implementing automation functions through abstraction layers, the system comprising:
a control application designed to communicate with automation equipment using one or more automation functions, wherein each automation function comprises one or more production environment-agnostic instructions;
a production abstraction framework executable in a runtime environment, wherein the production abstraction framework is configured to:
   during execution of the control application, receive production environment-agnostic instructions and an indication of a target production environment including an automation station's assembly process, a location of the automation station and details about a product produced by the automation station;
   translate the production environment-agnostic instructions into production environment-specific automation instructions executable on a particular unit of automation equipment in the target production environment,
   send the production environment-specific automation instructions to the particular unit of automation equipment.

10. The system of claim 9, further comprising:
a plug-in component installed at the particular unit of automation equipment that facilitates communications between the particular unit of automation equipment and the production abstraction framework.

11. The system of claim 10, wherein the runtime environment is executed on the particular unit of automation equipment.

12. The system of claim 10, wherein the runtime environment is executed on a computing system connected to the particular unit of automation equipment via one or more networks.

13. The system of claim 9, wherein (a) the particular unit of automation equipment interacts with a particular station in the target production environment; and (b) the production abstraction framework comprises a station abstraction component configured to translate at least a portion of the production environment-agnostic instructions into station-specific instructions for interacting with the particular station in the target production environment.

14. The system of claim 9, wherein (a) the target production environment is in a particular geographic location; and (b) the production abstraction framework comprises a location abstraction component configured to translate at least a portion of the production environment-agnostic instructions into location-specific instructions for accessing one or more resources at the particular geographic location.

15. The system of claim 9, wherein (a) the target production environment is configured to produce a particular product; and (b) the production abstraction framework comprises a location abstraction component configured to translate at least a portion of the production environment-agnostic instructions into product-specific instructions for interacting with the particular product.

16. The system of claim 9, wherein the production abstraction framework comprises a product composer component configured to automatically create the automation functions based on functionality requested by a user via a graphical user interface (GUI).

17. A system for implementing automation functions through abstraction layers, the system comprising:
a control application designed to communicate with automation equipment using one or more automation functions, wherein each automation function comprises instructions that are agnostic with respect to automation equipment and production environment;
a runtime environment comprising:
   an automation equipment abstraction layer configured to translate at least a portion of the instructions into equipment-specific automation instructions executable on a particular unit of automation equipment, and
   a production abstraction layer configured to translate at least a portion of instructions into production environment-specific automation instructions executable by the particular unit of automation equipment in a target production environment based on the particular unit of automation equipment's assembly process, a location of the particular unit of automation equipment and details about a product produced by the particular unit of automation equipment.

18. The system of claim 17, further comprising:
a plug-in component installed at the particular unit of automation equipment that facilitates communications between the particular unit of automation equipment and the runtime environment.

19. The system of claim 18, wherein the runtime environment is executed on the particular unit of automation equipment.

20. The system of claim 18, wherein the runtime environment is executed on a computing system connected to the particular unit of automation equipment via one or more networks.

* * * * *